US010380726B2

United States Patent
Du et al.

(10) Patent No.: US 10,380,726 B2
(45) Date of Patent: Aug. 13, 2019

(54) SYSTEMS, DEVICES, AND METHODS FOR GENERATING A SOCIAL STREET VIEW

(71) Applicant: UNIVERSITY OF MARYLAND, College Park, MD (US)

(72) Inventors: Ruofei Du, Greenbelt, MD (US); Amitabh Varshney, Potomac, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 15/559,955

(22) PCT Filed: Mar. 21, 2016

(86) PCT No.: PCT/US2016/023429
§ 371 (c)(1),
(2) Date: Sep. 20, 2017

(87) PCT Pub. No.: WO2016/154121
PCT Pub. Date: Sep. 29, 2016

(65) Prior Publication Data
US 2018/0075591 A1    Mar. 15, 2018

Related U.S. Application Data

(60) Provisional application No. 62/135,941, filed on Mar. 20, 2015.

(51) Int. Cl.
*G06F 3/14* (2006.01)
*G06T 5/50* (2006.01)
(Continued)

(52) U.S. Cl.
CPC .............. *G06T 5/50* (2013.01); *G06F 3/14* (2013.01); *G06T 11/60* (2013.01); *G11B 27/105* (2013.01);
(Continued)

(58) Field of Classification Search
CPC .................. G06T 19/006; G06T 11/60
See application file for complete search history.

(56) References Cited

U.S. PATENT DOCUMENTS

| | | | |
|---|---|---|---|
| 2010/0066750 A1 | 3/2010 | Yu et al. | |
| 2012/0216149 A1* | 8/2012 | Kang | G06F 3/04815 715/848 |

(Continued)

FOREIGN PATENT DOCUMENTS

| | | |
|---|---|---|
| WO | 2013053985 A1 | 4/2013 |
| WO | 2014031899 A1 | 2/2014 |

OTHER PUBLICATIONS

International Preliminary Report and Written Opinion dated Oct. 5, 2017 for application No. PCT/US2016/023429 (6 pages).

*Primary Examiner* — Jeffery A Brier
(74) *Attorney, Agent, or Firm* — Carter, DeLuca, Farrell LLP; George Likourezos

(57) ABSTRACT

Disclosed are systems, devices, and methods for creating a rendering of real-world locations with embedded multimedia elements. An exemplary method includes receiving image data of a real-world location, identifying geographic coordinates of the real-world location and/or a point of view from which the image data was acquired, acquiring multimedia elements relevant to the real-world location based on the geographic coordinates and/or the point of view, and creating a rendering of the image data with the multimedia elements embedded therein.

19 Claims, 8 Drawing Sheets

(51) Int. Cl.
*G06T 11/60* (2006.01)
*G11B 27/10* (2006.01)
*H04L 29/08* (2006.01)

(52) U.S. Cl.
CPC .................. *G06T 2200/24* (2013.01); *G06T 2207/20221* (2013.01); *G09G 2340/12* (2013.01); *H04L 67/10* (2013.01); *H04L 67/18* (2013.01)

(56) References Cited

U.S. PATENT DOCUMENTS

| | | | |
|---|---|---|---|
| 2013/0222369 A1* | 8/2013 | Huston | G06T 17/00 345/419 |
| 2013/0293582 A1 | 11/2013 | Ng-Thow-Hing et al. | |
| 2014/0059447 A1 | 2/2014 | Berk | |
| 2014/0099632 A1* | 4/2014 | Deng | G01N 21/6428 435/6.1 |
| 2015/0062114 A1* | 3/2015 | Ofstad | G06T 19/006 345/419 |
| 2015/0178257 A1* | 6/2015 | Jones | G06F 17/241 345/419 |
| 2015/0235630 A1* | 8/2015 | Rasmusson | G09G 5/377 345/592 |

* cited by examiner

SYSTEMS, DEVICES, AND METHODS FOR GENERATING A SOCIAL STREET VIEW

PRIORITY CLAIM

The present application is a 371 application which claims priority to and the benefit of PCT Application No. PCT/US2016/023429, filed on Mar. 21, 2016, which claims priority to and the benefit of U.S. Provisional Patent Application No. 62/135,941 by Ruofei Du and Amitabh Varshney, entitled "SYSTEM AND METHOD FOR SOCIAL STREET VIEW," filed on Mar. 20, 2015, the entire contents of which are incorporated herein by reference.

GOVERNMENT SUPPORT

This invention was made with government support under CNS1429404 awarded by the National Science Foundation. The government has certain rights in the invention.

BACKGROUND

Technical Field

The present disclosure relates to the generation of a social street view, and, more particularly, to systems, devices, and methods for assembling, organizing, and formatting multimedia elements from various sources, and generating renderings of real-world locations incorporating the multimedia elements.

Description of Related Art

Social media have become a ubiquitous part of how people share information with each other. Millions of people share and/or view social media content, such as pictures, videos, textual, and audio messages every day. However, most social media platforms generally only allow such social media content to be viewed in a linear manner, i.e., pictures may only be viewed one at a time and in sequence. Some social media platforms may organize the social media content in a two-dimensional layout, but the organization is often arbitrary. There exists a need for improvement in the manner in which social media content is displayed to and experienced by a viewer.

SUMMARY

Provided in accordance with the present disclosure is a method for creating a rendering of real-world locations with embedded multimedia elements. In an aspect of the present disclosure, the method includes receiving image data of a real-world location, identifying geographic coordinates of the real-world location and/or a point of view from which the image data was acquired, acquiring multimedia elements relevant to the real-world location based on the geographic coordinates and/or the point of view, and creating a rendering of the image data with the multimedia elements embedded therein.

In another aspect of the present disclosure, the method further includes displaying the rendering of the image data with the multimedia elements embedded therein.

In a further aspect of the present disclosure, the multimedia elements are geo-tagged, and wherein the multimedia elements are acquired based on geo-tag information of the multimedia elements.

In another aspect of the present disclosure, the multimedia elements include pictures.

In a further aspect of the present disclosure, the multimedia elements include videos.

In another aspect of the present disclosure, the multimedia elements include textual messages, gestures, graffiti, or audio messages.

In a further aspect of the present disclosure, the multimedia elements include sentiments derived from pictures, videos, textual messages, gestures, graffiti, or audio messages.

In another aspect of the present disclosure, the multimedia elements are embedded in the image data in a manner which fuses the multimedia elements with the image data.

In a further aspect of the present disclosure, fusing the multimedia elements with the image data includes determining a geometry of the real-world location based on the image data, and aligning the multimedia elements with the determined geometry of the real-world location.

In yet a further aspect of the present disclosure, aligning the multimedia elements with the determined geometry of the real-world location includes displaying the multimedia elements on the sides of buildings in the image data.

In another aspect of the present disclosure, aligning the multimedia elements with the determined geometry of the real-world location includes displaying the multimedia elements on virtual billboards in the image data.

In yet another aspect of the present disclosure, the image data include still images of the real-world location.

In a further aspect of the present disclosure, the image data include video images of the real-world location.

In another aspect of the present disclosure, displaying the rendering of the image data with the multimedia elements embedded therein includes displaying the rendering using a virtual reality or augmented reality display.

In a further aspect of the present disclosure, the multimedia elements are received from social media platforms.

In another aspect of the present disclosure, the method further includes filtering the acquired multimedia elements based on user-defined parameters.

In a further aspect of the present disclosure, the user-defined parameters include a date, a time, a season, a person, group of people, a social media profile, a keyword, a distance from the real-world location, or a data type of the multimedia elements.

Provided in accordance with the present disclosure is a system for creating a rendering of real-world locations with embedded multimedia elements. In an aspect of the present disclosure, the system includes a computing device including a processor and a memory storing instructions which, when executed by at least one processor, causes the computing device to, receive image data of a real-world location, identify geographic coordinates of the real-world location and/or a point of view from which the image data was acquired, acquire multimedia elements relevant to the real-world location based on the geographic coordinates and/or the point of view, create a rendering of the image data with the multimedia elements embedded therein, and send the rendering of the image data with the multimedia elements embedded therein, and a display device configured to, receive the rendering of the image data with the multimedia elements embedded therein, and display the rendering of the image data with the multimedia elements embedded therein.

In another aspect of the present disclosure, the display device is a virtual reality or augmented reality display device.

Provided in accordance with the present disclosure is a non-transitory computer-readable storage medium storing instructions which, when executed by at least one processor, cause a computer to receive image data of a real-world location, identify geographic coordinates of the real-world location and a point of view from which the image data was acquired, acquire multimedia elements relevant to the real-world location based on the geographic coordinates and the point of view, create a rendering of the image data with the multimedia elements embedded therein, and display the rendering of the image data with the multimedia elements embedded therein.

Any of the above aspects and embodiments of the present disclosure may be combined without departing from the scope of the present disclosure.

BRIEF DESCRIPTION OF THE DRAWINGS

These and other advantages will become more apparent from the following detailed description of the various embodiments of the present disclosure with reference to the drawings wherein.

DETAILED DESCRIPTION

In the Summary section above, in this Detailed Description, in the Claims below, and in the accompanying drawings, reference is made to particular features (including method steps or acts) of the present disclosure. It is to be understood that the disclosure in this specification includes combinations of parts, features, or aspects disclosed herein. For example, where a particular feature is disclosed in the context of a particular aspect or embodiment of the present disclosure, or a particular claim, that feature can also be used, to the extent possible, in combination with and/or in the context of other particular aspects and embodiments of the present disclosure, and in the disclosure generally.

The term "comprises" and grammatical equivalents thereof are used herein to mean that other components, ingredients, steps, acts, etc. are optionally present. For example, an article "comprising (or "which comprises") component A, B, and C can consist of (i.e., contain only) components A, B, and C, or can contain not only components, A, B, and C but also one or more additional components, elements, features, ingredients, steps, acts, etc.

Where reference is made herein to a method comprising two or more defined steps or acts, the defined steps or acts can be carried out in any order or simultaneously (except where the context excludes that possibility); and the method can include one or more other steps or acts which are carried out before any of the defined steps or acts, between two of the defined steps or acts, or after all the defined steps or acts (except where the context excludes that possibility).

When, in this specification, a range is given as "(a first number) to (a second number)" or "(a first number) (a second number)," this means a range whose lower limit is the first number and whose upper limit is the second number. For example, 25 to 100 mm means a range whose lower limit is 25 mm, and whose upper limit is 100 mm.

The present disclosure relates to the visualization of social media content in an immersive, context-aware, and location-aware display. Briefly stated, social media content, such as pictures, drawings, photographs, pictographs, videos, textual messages, comments, audio messages, etc., (referred to collectively hereinafter as "multimedia elements") may be analyzed to determine their relevance to a particular real-world location. A rendering may then be created wherein the multimedia elements are embedded into image data of the real world location. A user may view the rendering and thereby experience the multimedia elements in an immersive, context-aware, and location-aware display.

Figure 1:
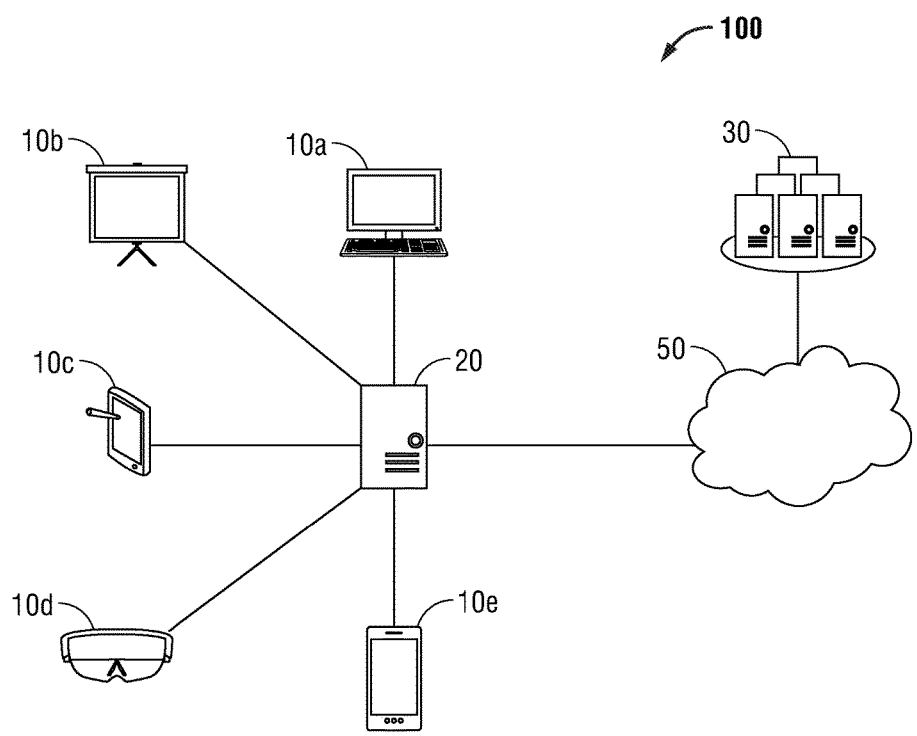
FIG. 1 is a simplified diagram of a system for creating and viewing renderings of real-world locations with embedded multimedia elements, according to an embodiment of the present disclosure.

With reference to the drawings, FIG. 1 shows an exemplary system 100 for creating a rendering of real-world locations with multimedia elements embedded therein. System 100 may include, among other things, a user device 10 including a display, and a computing device 20 connected to a server 30 via a network 50.

User device 10 may be any of a variety of user devices which may be configured to display images. In embodiments, user device 10 may be a computer 10a, a television or image projection system 10b, a tablet 10c, a virtual reality or augmented reality device 10d, a smartphone 10e, and/or any other devices known to those skilled in the art which may be configured to display images. Virtual reality or augmented reality device 10d may include one or more desktop monitors, mobile phones, tablets, head-mounted displays and/or tiled displays.

Computing device 20 may be any computer, server, processor, or other multiples or combinations of the same, which may be configured to receive image data and multimedia elements, analyze and process such image data and multimedia elements, and generate images including the rendering of a real-world location with the multimedia elements embedded therein. While shown in FIG. 1 and described herein as a separate device from user device 10, it is envisioned that computing device 20 and user device 10 may be a single device configured to perform the functions of both computing device 20 and user device 10. Alternatively, computing device 20 may be a server located remotely from user device 10 and may send a fully generated rendering to user device 10 to simply be displayed by user device 10.

Server 30 may be any server or array of servers used by social media platforms to store multimedia elements. For example, server 30 may be a server used by a social network, such as FACEBOOK®, TWITTER®, INSTAGRAM®, etc., to store multimedia elements associated with user profiles on the social network. Similarly, server 30 may be a server used by media organizations, other multimedia content aggregators, or individual websites that make the multimedia elements stored on their servers available for use by the public.

Network 50 may be any network or collection of networks used to connect computing device 20 to server 30. In an embodiment, user device 10 may also be connected to computing device 20 and/or server 30 via network 50. Network 50 may include local area networks (LANs) consisting of wired and/or wireless networks, wide area networks (WANs), a wireless mobile network, a BLUETOOTH® network, and/or the internet.

Figure 2:
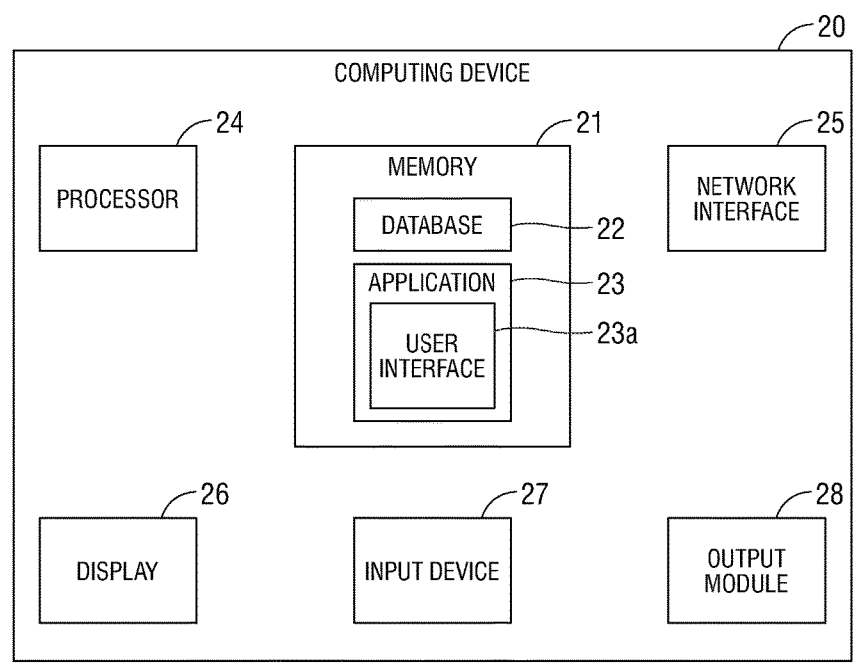
FIG. 2 is a simplified box diagram of an exemplary computing device forming part of the system of FIG. 1.

Turning now to FIG. 2, there is shown a simplified block diagram of computing device 20. Computing device 20 may include a memory 21, a processor 24, a display 26, a network interface 25, an input device 27, and/or an output module 28. Memory 21 may store an application 23 and/or a database 22. Database 22 may store, among other things, image data and/or multimedia elements. Application 23 may, when executed by processor 24, cause display 26 to present user interface 23*a*.

Memory 21 may include any non-transitory computer-readable storage media for storing data and/or software that is executable by processor 24 and which controls the operation of computing device 20. In an embodiment, memory 21 may include one or more solid-state storage devices such as flash memory chips. Alternatively or in addition to the one or more solid-state storage devices, memory 21 may include one or more mass storage devices connected to the processor 24 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 24. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by computing device 20.

Processor 24 may be any single or collection of processors. In embodiments, processor 24 may be a central processing unit (CPU) configured to control computing device 20. In further embodiments, processor 24 may be a dedicated graphical processing unit (GPU) specialized to perform graphics processing. Network interface 25 may be configured to connect to a network such as network 50. Input device 27 may be any device by means of which a user may interact with computing device 20, such as, for example, a mouse, keyboard, foot pedal, touch screen, and/or voice interface. Output module 28 may include any connectivity port or bus, such as, for example, parallel ports, serial ports, universal serial busses (USB), or any other similar connectivity port known to those skilled in the art.

Figure 3:
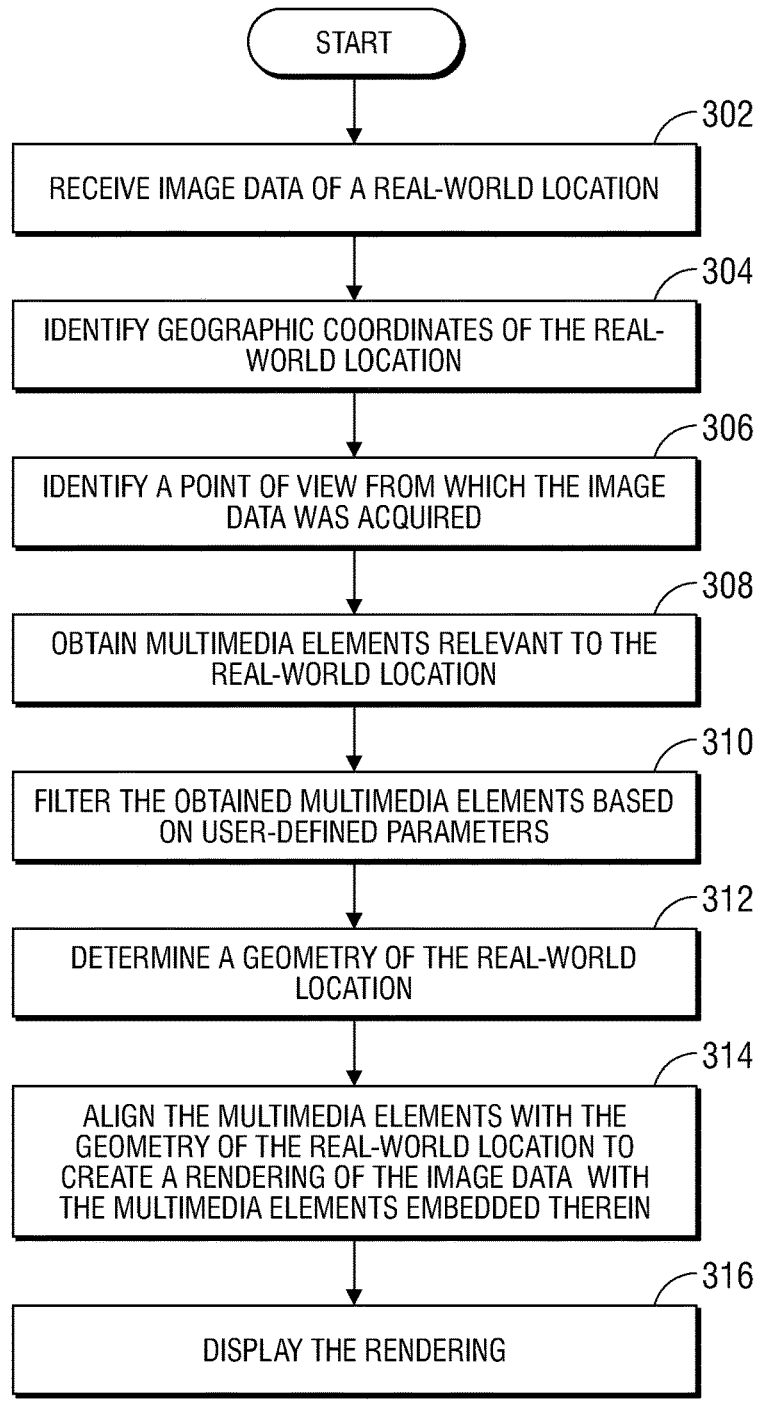
FIG. 3 is a flowchart of an exemplary method for creating and viewing renderings of real-world locations with embedded multimedia elements, according to an embodiment of the present disclosure.

Regarding FIG. 3, there is shown a flowchart of an exemplary method for creating a rendering of real-world locations with embedded multimedia elements. As noted above, user device 10 and computing device 20 may each be a distinct device, or may be a single device performing the functions of both devices. For purposes of clarity, the examples described below refer to user device 10 and computing device 20 as distinct devices. However, these examples are not intended to be limiting, and those skilled in the art will recognize that the same or similar functions described below may be performed by a single, unified device.

Starting at step 302, computing device 20 may receive image data of a real-world location. The image data may be received from a server where it is being stored, and/or may be received directly from a capturing device that acquired the image data. In embodiments, the image data of the real-world location may be GOOGLE® STREET VIEW® image data and/or MICROSOFT® BING® STREETSIDE® image data. In other embodiments, the image data of the real-world location may be acquired by a user, for example, by using user device 10. The image data may include still images such as panoramic photographs and/or digitally fused or "stitched-together" photographs of a real-world location. The image data may further include one or more videos of the real-world location. For example, the image data may include monoscopic, stereoscopic, and/or multiscopic images and/or videos, including 360 degree panoramic videos of a real-world location. The image data may also include live images of a real-world location.

Next, at step 304, computing device 20 identifies geographic coordinates of the real-world location. The geographic coordinates may be identified based on metadata associated with the image data, for example geo-tags. The geographic coordinates may also be identified by analyzing the image data and determining a geographic location based on the image data.

Thereafter, or concurrently with step 304, computing device 20 identifies a point of view from which the image data was acquired at step 306. The point of view may be identified based on metadata associated with the image data. The point of view may also be identified by analyzing the image data and determining the point of view based on the image data.

Next, at step 308, computing device 20 obtains multimedia elements relevant to the real-world location. The multimedia elements may be obtained from server 30, as described above. The relevancy of the multimedia elements to the real-world location may be determined based on the geographic coordinates identified at step 304 and/or the point of view identified at step 306. The multimedia elements may be any of the social media content described above, such as pictures, drawings, graffiti, gestures, photographs including 2D photos, 3D photos, stereoscopic photos, and/or panoramic photos, videos, computer-generated virtual reality or augmented reality renderings, audio recordings, audio messages, textual messages including TWEETS®, blog posts, instant messages, text memos, etc., and/or sentiments derived from any of these media types, such as based on text, emoticons, facial expressions, and the like.

At step 310, computing device 20 filters the obtained multimedia elements based on user-defined parameters. For example, the user may specify that only multimedia elements shared by family members, a specific person or group of people, or a particular public figure should be included, such that a filter parameter may be defined based on the user's preferences. The filter may also be defined based on a keyword. In another example, the parameters may limit the multimedia elements to elements that were created on a particular date or during a particular season or other range of dates, at a particular time of day, within a particular distance from the real-world location, etc. The parameters may also restrict the source of the multimedia elements, such that, for example, only multimedia elements posted to FACE-BOOK® may be used. Additionally, the parameters may restrict the type of multimedia elements that may be used, for example, only photographs.

Figure 4B:
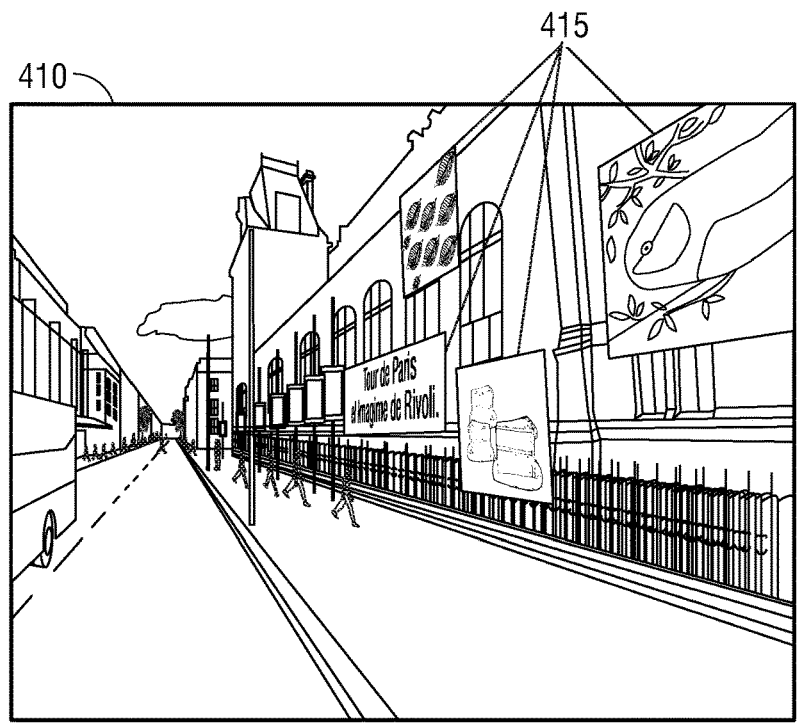
FIGS. 4A and 4B are example renderings of a real-world location with embedded multimedia elements, according to an embodiment of the present disclosure.

Thereafter, or concurrently with the execution of any or all of steps 304-310, computing device 20 may, at step 312, determine a geometry of the real-world location in the image data. For example, if the real-world location depicted in the image data is an urban environment, as shown in FIG. 4B, computing device 20 may determine that there are buildings in the image data and may determine the geometry of such buildings. Various image processing algorithms may be used to determine the geometry of the real-world location.

Next, at step 314, computing device 20 aligns the multimedia elements with the geometry of the real-world location to create a rendering of the image data with the multimedia elements embedded therein. For example, computing device 20 may align images with the sides of buildings or other objects in the image data. In another example, computing device 20 may create virtual billboards in the image data and align textual information such as TWEETS® with the virtual billboards. Aligning the multimedia elements with the geometry of the real-world location may be performed using various image processing algorithms, including maximal Poisson sampling among others, and may further be based on depth and normal maps, road orientations, image saliency, etc., in a manner that reduces visual clutter.

In further embodiments, the multimedia elements may be presented with respect to any real-world feature, i.e., aligned to the side of a road, a billboard, a bus-stop, a traffic sign, and/or any other landscape feature. In other embodiments, the multimedia elements may appear to be floating in mid-air relative to the user's point of view and not aligned to any geometric feature of the landscape.

Thereafter, computing device 20 may send the created rendering of the image data with the multimedia elements embedded therein to user device 10. User device 10 may then, at step 316, display the rendering of the image data with the multimedia elements embedded therein.

As noted above, user device 10 may be a virtual reality or augmented reality device 10d, which may be used to display the rendering of the real-world location with the multimedia elements embedded therein. In such embodiments, a truly immersive, three-dimensional rendering of the real-world location may be displayed to the user, with the multimedia elements embedded in 360 degrees around the user. Among the various features which may be used in virtual and/or augmented reality embodiments are the performance of various actions and/or gestures by a user to view and/or interact with the rendering of the real-world environment and/or the multimedia elements embedded therein. For example, multimedia elements may be locked or have access restricted, and may be unlocked by a user providing, such as by entering or speaking, a password, and/or by performing a particular action and/or gesture, as described below with reference to FIG. 8. In such an example, the user may be required to view a particular real-world location, and perform actions and/or gestures as shown by a multimedia element to unlock the social media content protected by the gesture.

In a further embodiment, it is envisioned that a user, using user device 10, may capture live images of a real-world location where the user is located, and, by using the captured live images as the image data received in step 302 of the above-described method, allow computing device 20 to create a rendering of the real-world location using live images, and embedding the multimedia elements in such live images.

Figure 4A:
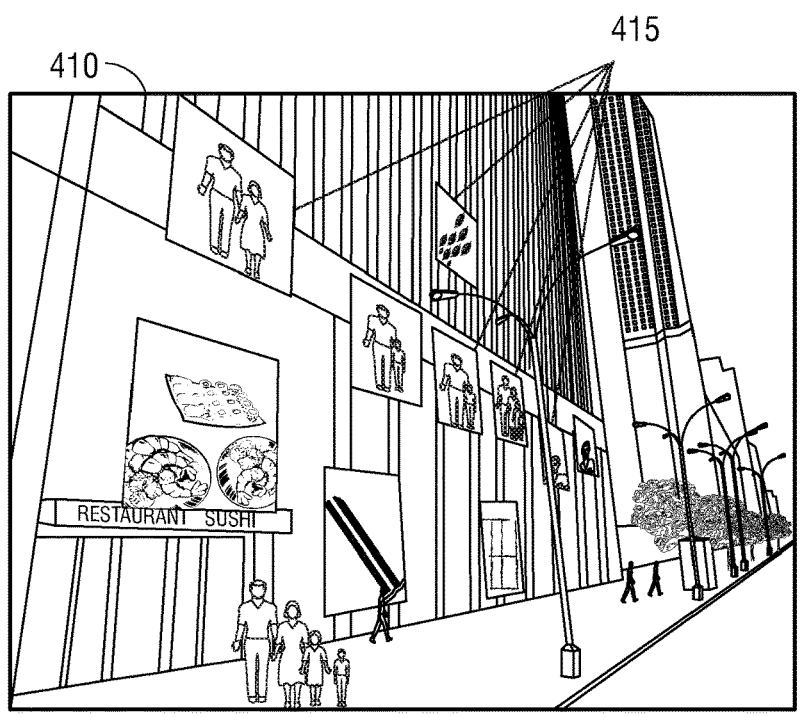

Turning now to FIGS. 4A and 4B, there is shown example renderings of real-world locations with multimedia elements embedded therein. In FIG. 4A, image data 410 of an urban setting is shown with multimedia elements 415, in this instance photographs that were taken around or inside of a building, embedded in the image data so as to appear on the outside of the building. Similarly, in FIG. 4B, image data 410 of another urban setting is shown with multimedia elements 415 embedded in the image data so as to appear on the outside of the building. Multimedia elements 415 are arranged, for example, by using maximal Poisson sampling, such as to reduce visual clutter in the rendering.

Figure 5A:
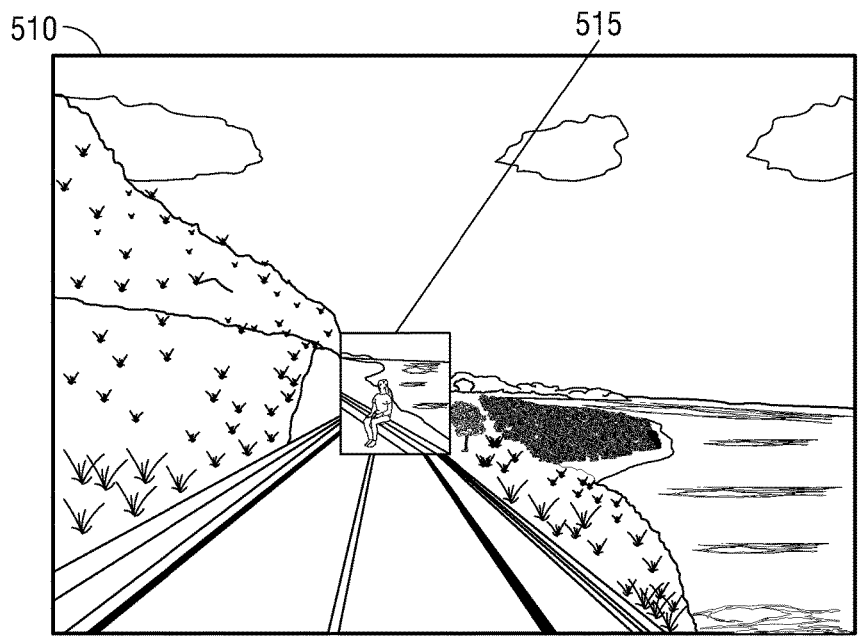
FIGS. 5A and 5B are further example renderings of a real-world location with embedded multimedia elements, according to an embodiment of the present disclosure.
Figure 5B:
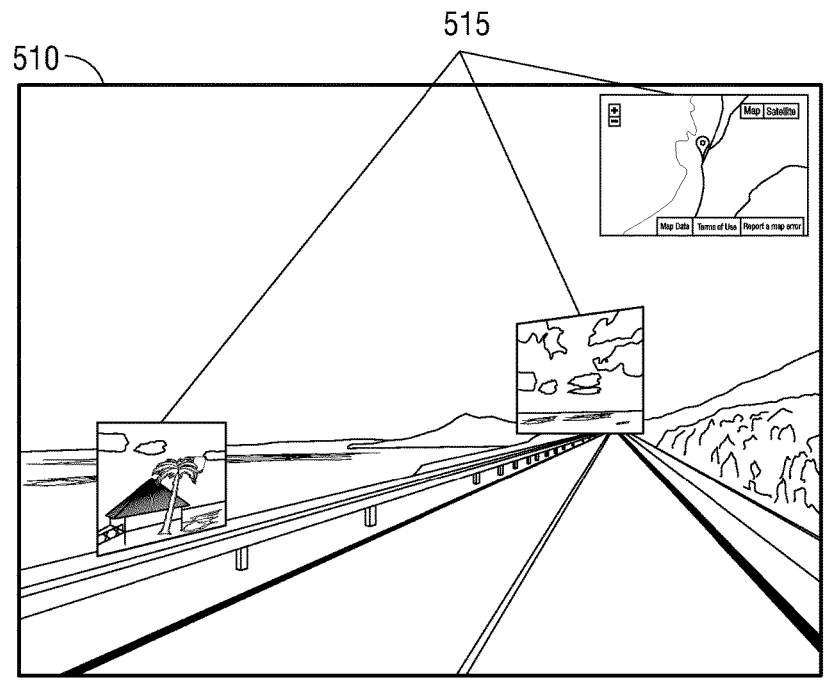

In FIGS. 5A and 5B, there is shown further example renderings of real-world locations with multimedia elements embedded therein. In FIG. 5A, image data 510 of a coastal road is shown with a multimedia element 515, in this instance a photograph taken beside the road, embedded therein to appear at the geographic location where the photograph was taken. Likewise, in FIG. 5B, image data 510 of another coastal road is shown with multimedia elements 515, in this instance photographs taken beside the road and a map of the area, embedded therein and arranged in a manner to reduce visual clutter, as is shown with the map appearing in the top-right corner of the image data.

Figure 6A:
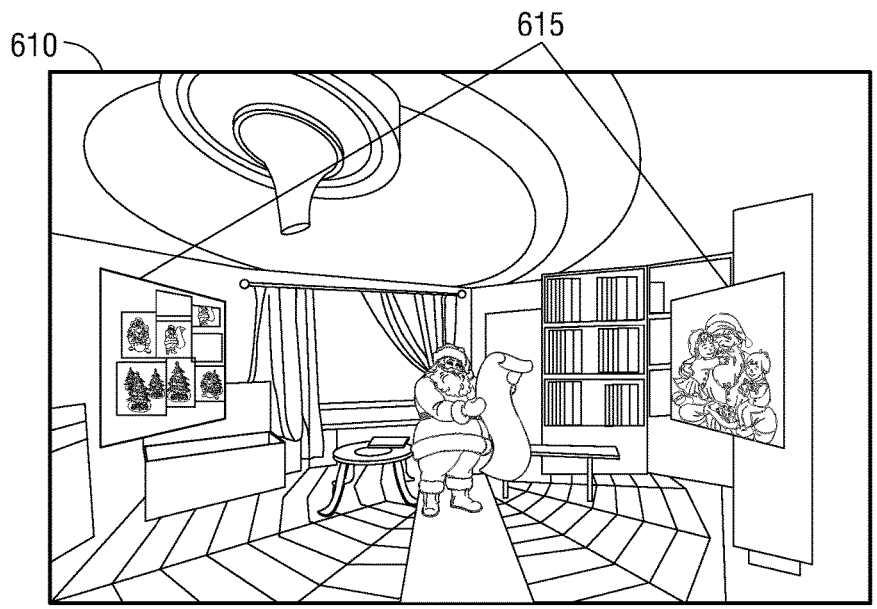
FIGS. 6A and 6B are still further example renderings of a real-world location with embedded multimedia elements, according to an embodiment of the present disclosure.
Figure 6B:
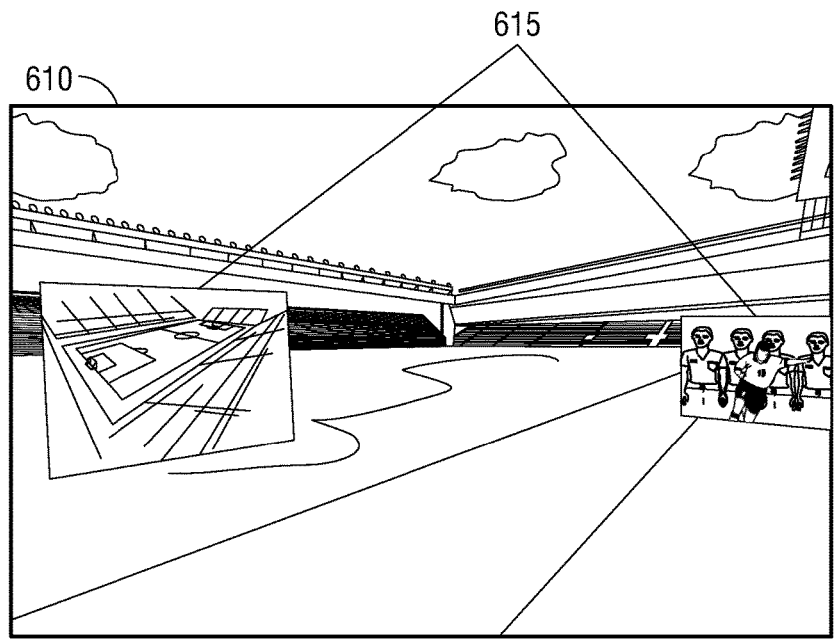

The systems, devices, and method of the present disclosure may also be used inside buildings, as is shown in FIGS. 6A and 6B. FIG. 6A shows an example rendering of a real-world location with multimedia elements 615 embedded therein. In this instance, image data 610 of a stage is shown with multimedia elements 615, in this instance photographs that were taken on or near the stage, embedded therein and arranged in a manner to reduce visual clutter and not obstruct the focal point of the image, i.e., the middle of the stage. In FIG. 6B, image data 610 of the inside of a stadium is shown with multimedia elements 615, in this instance photographs that were taken inside the stadium, embedded therein.

Figure 7:
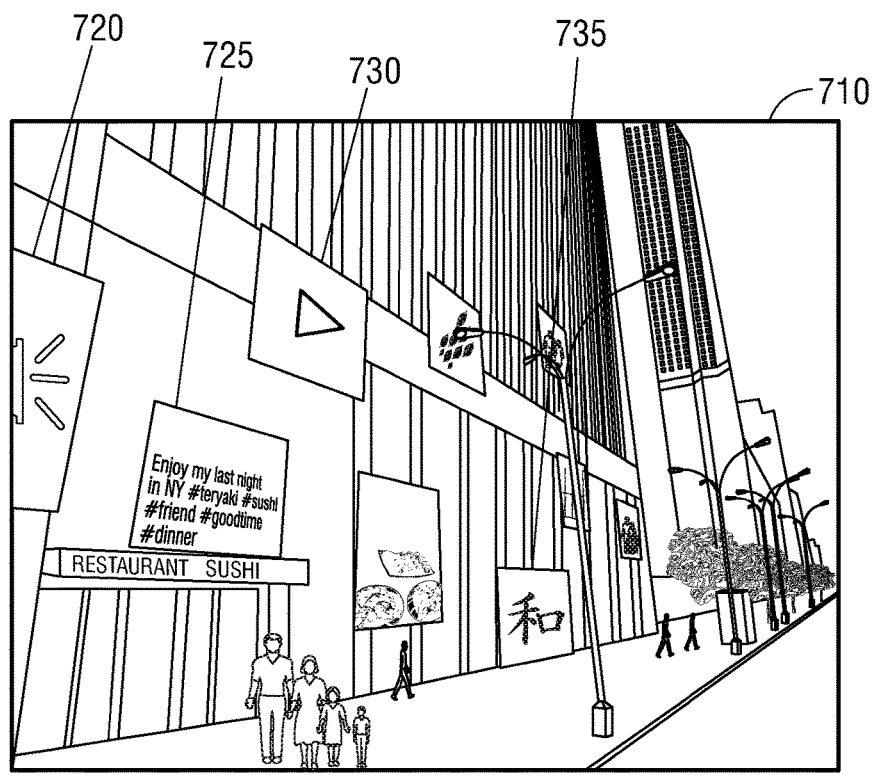
FIG. 7 is another example rendering of a real-world location with different multimedia elements embedded therein, according to an embodiment of the present disclosure.

FIG. 7 shows another example rendering of an urban environment. Here, image data 710 of the outside of a building is shown with multimedia elements embedded therein. In this instance, multimedia elements such as audio recordings 720, textual messages 725, videos 730, and graffiti 735 are shown as embedded in image data 710.

Figure 8A:
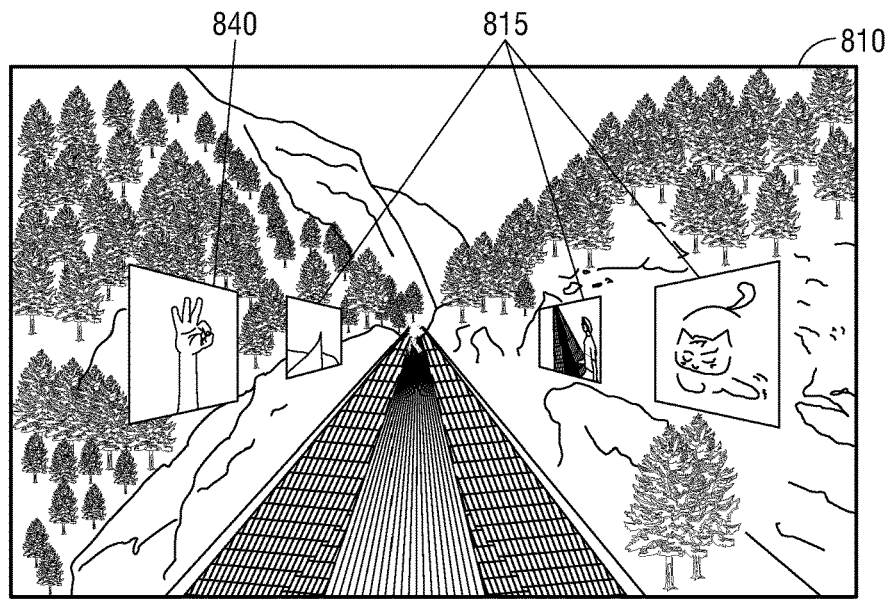
FIGS. 8A and 8B are further example renderings of a real-world location with various multimedia elements embedded therein, according to an embodiment of the present disclosure.
Figure 8B:
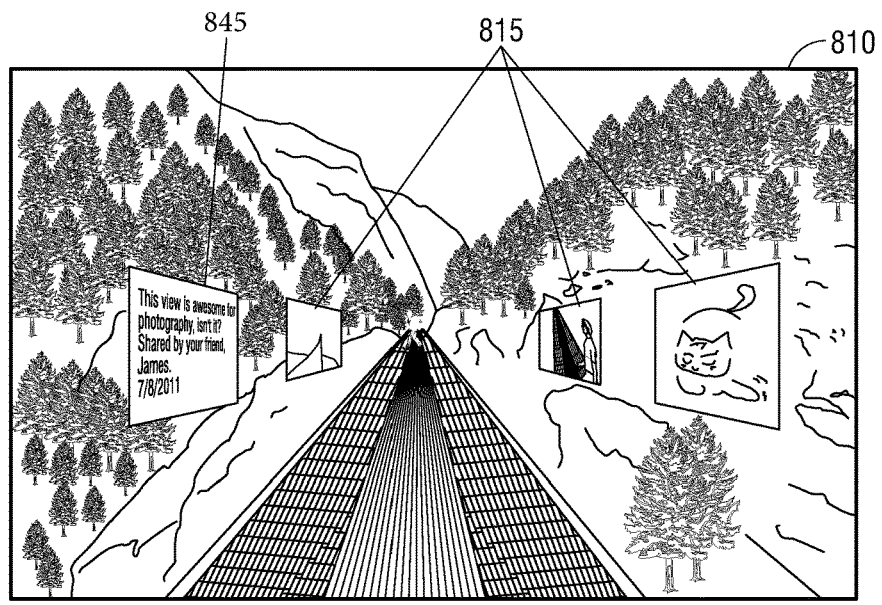

FIGS. 8A and 8B demonstrate another embodiment of the present disclosure. FIG. 8A shows image data 810 of a rural landscape with multimedia elements 815 shown alongside a trail. A particular multimedia element may be locked, as described above, with the gesture to be performed by the user required to unlock the multimedia element shown as gesture 840. After the user performs the required gesture, the multimedia element may be unlocked and displayed as text message 845, as shown in FIG. 8B.

Although the present disclosure has been described in considerable detail with reference to certain preferred versions thereof, other versions are possible and contemplated. Therefore, the spirit and scope of the appended claims should not be limited to the description of the preferred versions contained therein.

Any element in a claim that does not explicitly state "means for" performing a specified function or "step for" performing a specified function, is not to be interpreted as a "means" or "step" clause as specified in 35 U.S.C. § 112(f). In particular, the use of "step of" in the claims is not intended to invoke the provisions of 35 U.S.C. § 112(f).

What is claimed is:

1. A method for creating a rendering of real-world locations with embedded multimedia elements, the method comprising:

receiving image data of a real-world location;
identifying geographic coordinates of the real-world location and/or a point of view from which the image data was acquired;
acquiring multimedia elements relevant to the real-world location based on the geographic coordinates and/or the point of view; and
creating a rendering of the image data with the multimedia elements embedded therein,
wherein the multimedia elements are embedded in the image data in a manner which fuses the multimedia elements with the image data,
wherein fusing the multimedia elements with the image data includes:
determining a geometry of the real-world location based on the image data; and
aligning the multimedia elements with the determined geometry of the real-world location,
wherein the aligning includes maximal Poisson sampling.

2. The method according to claim 1, further comprising displaying the rendering of the image data with the multimedia elements embedded therein.

3. The method according to claim 1, wherein the multimedia elements are geo-tagged, and wherein the multimedia elements are acquired based on geo-tag information of the multimedia elements.

4. The method according to claim 1, wherein the multimedia elements include pictures.

5. The method according to claim 1, wherein the multimedia elements include videos.

6. The method according to claim 1, wherein the multimedia elements include textual messages, gestures, graffiti, or audio messages.

7. The method according to claim 1, wherein the multimedia elements include sentiments derived from pictures, videos, textual messages, gestures, graffiti, or audio messages.

8. The method according to claim 1, wherein aligning the multimedia elements with the determined geometry of the real-world location includes displaying the multimedia elements on the sides of buildings in the image data.

9. The method according to claim 1, wherein aligning the multimedia elements with the determined geometry of the real-world location includes displaying the multimedia elements on virtual billboards in the image data.

10. The method according to claim 1, wherein the image data include still images of the real-world location.

11. The method according to claim 1, wherein the image data include video images of the real-world location.

12. The method according to claim 1, wherein displaying the rendering of the image data with the multimedia elements embedded therein includes displaying the rendering using a virtual reality or augmented reality display.

13. The method according to claim 1, wherein the multimedia elements are received from social media platforms.

14. The method according to claim 1, further comprising filtering the acquired multimedia elements based on user-defined parameters.

15. The method according to claim 14, wherein the user-defined parameters include a date, a time, a season, a person, group of people, a social media profile, a keyword, a distance from the real-world location, or a data type of the multimedia elements.

16. The method according to claim 1, wherein the image data includes 360 degree panoramic video images of the real-world location.

17. A system for creating a rendering of real-world locations with embedded multimedia elements, the system comprising:
a computing device including a processor and a memory storing instructions which, when executed by at least one processor, causes the computing device to:
receive image data of a real-world location;
identify geographic coordinates of the real-world location and/or a point of view from which the image data was acquired;
acquire multimedia elements relevant to the real-world location based on the geographic coordinates and/or the point of view;
create a rendering of the image data with the multimedia elements embedded therein; and
send the rendering of the image data with the multimedia elements embedded therein; and
a display device configured to:
receive the rendering of the image data with the multimedia elements embedded therein; and
display the rendering of the image data with the multimedia elements embedded therein,
wherein the multimedia elements are embedded in the image data in a manner which fuses the multimedia elements with the image data,
wherein when fusing the multimedia elements with the image data, the instructions, when executed by the processor, cause the computer to:
determine a geometry of the real-world location based on the image data; and
align the multimedia elements with the determined geometry of the real-world location,
wherein the aligning includes maximal Poisson sampling.

18. The system according to claim 17, wherein the display device is a virtual reality or augmented reality display device.

19. A non-transitory computer-readable storage medium storing instructions which, when executed by at least one processor, cause a computer to:
receive image data of a real-world location;
identify geographic coordinates of the real-world location and a point of view from which the image data was acquired;
acquire multimedia elements relevant to the real-world location based on the geographic coordinates and the point of view;
create a rendering of the image data with the multimedia elements embedded therein; and
display the rendering of the image data with the multimedia elements embedded therein,
wherein the multimedia elements are embedded in the image data in a manner which fuses the multimedia elements with the image data,
wherein when fusing the multimedia elements with the image data, the instructions, when executed by the processor, cause the computer to:
determine a geometry of the real-world location based on the image data; and
align the multimedia elements with the determined geometry of the real-world location,
wherein the aligning includes maximal Poisson sampling.

* * * * *